(No Model.)

A. E. G. LUBKE.
ELECTRIC MOTOR.

No. 292,930. Patented Feb. 5, 1884.

ATTEST:
Fred Haynes
Ed L. Moran

INVENTOR:
A. E. G. Lubke
by his Attorneys
Brown & Brown

N. PETERS. Photo-Lithographer, Washington, D. C.

UNITED STATES PATENT OFFICE.

ADOLPH E. G. LUBKE, OF NEW YORK, N. Y., ASSIGNOR OF ONE-HALF TO OTTO HEIKEL, OF JERSEY CITY, NEW JERSEY.

ELECTRIC MOTOR.

SPECIFICATION forming part of Letters Patent No. 292,930, dated February 5, 1884.

Application filed July 31, 1882. (No model.)

*To all whom it may concern:*

Be it known that I, ADOLPH E. G. LUBKE, of New York, in the county and State of New York, have invented a new and useful Improvement in Electric Motors, of which the following is a specification.

The improvement relates to an electric motor comprising a rotary armature, field electro-magnets provided with pole-pieces which are arranged eccentrically to the armature, an electric circuit, and a switch or switches, all being so combined and organized that by the operation of the switch or switches the coils of the field electro-magnet may be partially or wholly short-circuited out and reinstated.

Figure 1:
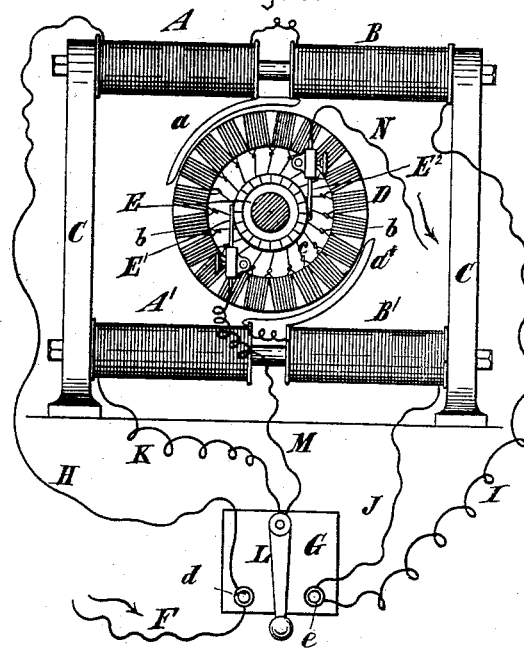
Figure 2:
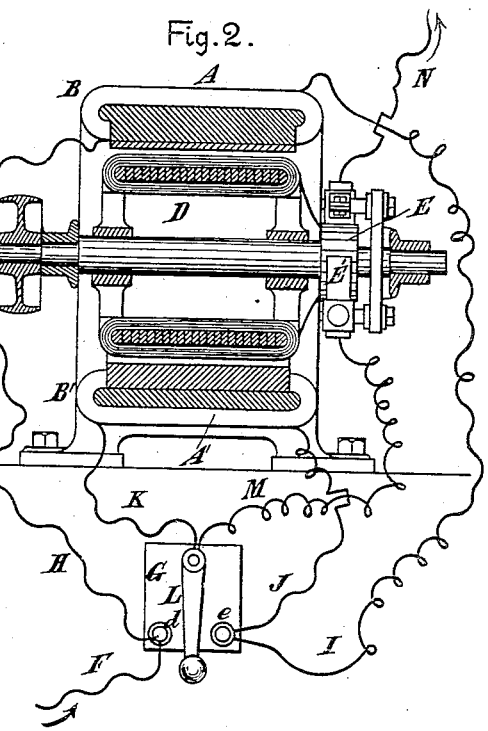
Figure 3:
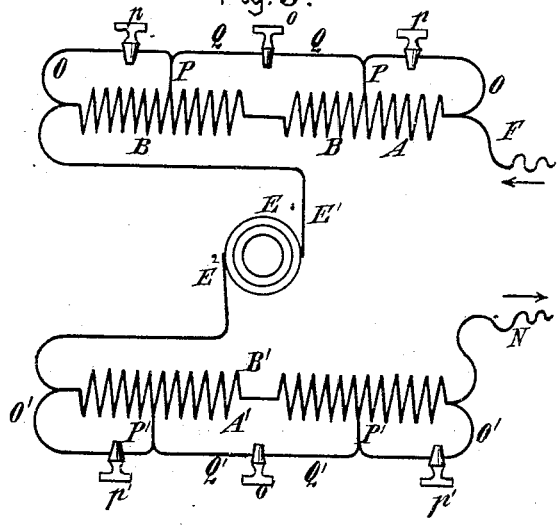
Figure 4:
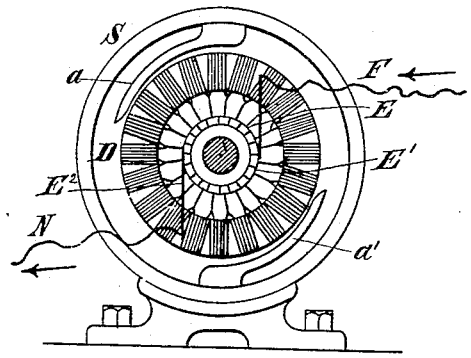

In the accompanying drawings, Figure 1 is a front view of an electric motor embodying my improvement. Fig. 2 is a central vertical section of the same, taken at right angles. Fig. 3 is a diagram illustrative of a modification of this motor, and Fig. 4 is a front view of an electric motor of modified form embodying my improvement.

Similar letters of reference designate corresponding parts in all the figures.

In Figs. 1, 2, and 3, A A' designate field-magnets of the motor. They are provided, at about the middle of their length, with arc-shaped polar extensions $a\ a'$. The portions of the cores of these magnets which are on different sides of the polar extensions $a\ a'$ are wound with insulated wire, B B', in reverse directions, so as to polarize both portions similarly where they meet—or, in other words, at the middle of the magnets, and reversely at the ends. The wires B B' are so wound on the magnets A A' that one magnet—in this instance the magnet A—will have its north pole at the middle, and the other—in this instance the magnet A'—will have its south pole in the middle. The polar extensions $a\ a'$ will of course be one of north and the other of south polarity. The magnets A A' are supported by standards C, which may be erected on a base-piece of any suitable kind.

D designates the armature of the motor. It is of circular form, and provided with coils of insulated wire, $b$, whose ends are united and connected by wires $c$ with the metal plates of a commutator, E. This commutator is provided with the usual metallic brushes, E' E².

F designates a wire leading from a dynamo-electric machine, or other source of electricity, to a contact-piece, $d$, on a switch-board, G. A wire, H, extends from the contact-piece $d$ to one end of the wire of the magnet A. From the other end of the wire of this magnet a wire, I, extends to a contact-piece, $e$, on the switch-board G. From the contact-piece $e$ a wire, J, extends to one end of the wire of the magnet A'. A wire, K, extends from the other end of the wire of the magnet A' to a pivoted metallic lever, L, on the switch-board G. A wire, M, leads from the brush E' to the lever L, and a wire, N, leads from the other brush, E², to the dynamo-electric machine or other source of electricity. When the switch-lever L is turned, as shown in Figs. 1 and 2, so that it is out of contact with both contact-pieces $d\ e$, the electric current passes from the dynamo-electric machine or other source along the wire F to the contact-piece $d$, thence along the wire H to the wire of the magnet A, thence along the wire I to the contact-piece $e$, thence along the wire J to the wire of the magnet A', thence along the wire K to the switch-lever L. From the switch-lever L it passes along the wire M to the brush E', thence to the plates of the commutator E, thence to the wire of the armature D, thence back to the plates of the commutator, thence to the brush E², and, finally, from the brush E² back to the dynamo-electric machine or other source. The resistance of all the wire of the magnets A A' is then in circuit, and the armature will rotate slowly, but will exert its maximum power. The motor will be best adapted for certain work when thus used. If the switch-lever L is turned to the contact-piece $e$, the electric current will pass from the dynamo-electric machine or other source along the wire F to the contact-piece $d$, thence along the wire H to the wire of the magnet A, thence along the wire I to the contact-piece $e$, thence along the wire M to the brush E', thence to the plates of the commutator E, thence to the coils of the armature D, thence back to the commutator-plates, thence to the brush E², and, finally, back along the wire N to the dynamo-electric machine or other source. The wire of the magnet A' will then be short-circuited, and the armature will run more rapidly, but will exert less power than before. By turning the switch-lever L upon the contact-piece $d$, the electric current will pass from the dynamo-electric machine or other source along the wire F to the contact-piece $d$, thence to the switch-lever L, thence along the wire M to the brush E', thence to the plates of the commutator, thence along the coils of the wire of the armature, thence back to the commutator-plates, thence to the brush E², and thence along the wire N back to the dynamo-electric machine or other source. The wire of both magnets A A' will thus be short-circuited, and the armature will rotate much more rapidly than before, although exerting still less power. The employment of other switches will enable me to short-circuit portions of the wire of the magnets A A'. I have illustrated such switches in Fig. 3. Wires O extend from the outer ends of the wire of the magnet A. Other wires, P, extend from between the ends of the two portions of the magnet, and branch wires Q extend from the wires P into proximity with each other. Similar wires, O', P', and Q', are applied to the wire of the magnet A'. Plugs $o$ $o'$ and $p$ $p'$ are used in conjunction with these wires. If the plugs $o$ $o'$ are withdrawn and the plugs $p$ $p'$ inserted, the electric current will pass along the wires O O' to the wires P P', and the portions of the wire of the magnets A A' between the wires P P and P' P'. On the insertion of the plugs $o$ $o'$ and withdrawal of the plugs $p$ $p'$ the electric circuit will pass along the portions of the wires of the magnets A A' between the wires O O' and the wires P P', and along the wires Q Q' and plugs $o$ $o'$. By making the portions of the wires B B' which are on reverse sides of the wires P P' of different lengths, it is obvious that I can vary the amount of wire through which the current passes by means of the said plugs $o$ $o'$ $p$ $p'$. If the plugs $o$ $o'$ $p$ $p'$ are all inserted, the current will pass along the wires O O' P P' Q Q'.

The motor shown in Fig. 4 has no field-magnets. Its armature D is wound with coils of wire, provided with a commutator, E, and with metallic brushes E' E². Wires F and N connect these brushes with a dynamo-electric machine or other source of electricity.

The cylindric shell S is made of iron or other suitable material, and has metallic arc-shaped extensions $a$ $a'$. In both examples of my invention, (shown in Figs. 1, 2, and 4,) the arc-shaped extensions $a$ $a'$ are shown as slightly eccentric to the exterior of the armature D. Thus arranged they are more effective, and their effect is more concentrated than it otherwise would be.

Upon reference to Fig. 2 it will be seen that the helices of the field-magnets are at the outer sides of the pole-plates $a$, and the helices of the armature are at the inner sides of such pole-plates. These helices are to be wound so as to promote magnetism in these pole-plates $a$ $a'$, thus intensifying the action between the magnetism of the pole-plates $a$ $a'$ and the pole-pieces of the armature-ring that intervene between the helices $b$, and increasing the power of the motor. It will be found in practice that when the helices of the field-magnets and armature are wound in the proper direction the currents in the coils tend to promote the magnetism of the pole-pieces $a$ and $a'$; but these pole-plates $a$ $a'$ must not be extended the other side of the point of contact with the field-cores, because if they are the currents in the helices would exert a neutralizing influence upon the magnetism of the pole-plates.

I am aware that in dynamo-electric machines the helices of the field-magnets have been partially cut out, in order to lessen the magnetism set up in the cores in proportion to the external current required.

If a steam-engine is run rapidly with the steam at a low pressure, the same amount of power may be developed as by a slow-running engine with the steam at high pressure.

One of the objects of this invention is to vary the speed of an electric motor and obtain the ultimate amount of work represented by the electro-motive force, either in the form of a rapid movement with less initial power, or a slower movement with greater initial power. If the motor, without any current in the helices A A' B B', or with the ring and pole-pieces $a$ $a'$, as in Fig. 4, is run with a given electro-motive force, it will move rapidly, because there will be a minimum of resistance to the electro-motive force in the field-magnets. If a current of the same electro-motive force is carried through the whole of the coils of the field-helices, Fig. 1, the greatest force will be set up in the motor; but it will be at the expense of diminished speed, and so on for all intermediate conditions.

I have discovered that a given electro-motive force may be converted into its equivalent in mechanical energy at different speeds by varying the helices of the field-magnet that are in the electric circuit. The more the helices are short-circuited the less the resistance and the more rapid the rotation of the armature. The less the helices are short-circuited the greater the resistance and the greater the magnetism developed and the greater the power, but the slower the speed—the law governing the development of mechanical power from electro-motive force corresponding generally to the well-recognized law of mechanics, that with a given force the power exerted is increased as the speed is diminished. If the motor is loaded with work, so that it moves more slowly, the magnetism will be augmented and the mechanical energy increased; but in order to obtain the greatest force from the whole of the magneto-motor the given current must pass through all the helices to obtain as much magnetism as possible. The speed of the motor, however, will be at the minimum. On the other hand, if the mechanical force required is rapid, the electric energy is translated directly into this more rapid mechanical force, by short-circuiting more or less of the field-helices and allowing the motor to run more rapidly. It is to be borne in mind that more or less electric energy is expended in converting the cores of the field-helices into magnets, and that forces are thus set up which react on the current and tend to lessen the rapidity of revolution of the armature and increase the mechanical force represented by such revolution of the armature, and the reverse when the magnetism of the field-helices is lessened. In this respect the reactionary force set up by the revolution of the armature in a magnetic motor may be compared to the current developed by the revolution of a similar armature by mechanical force in a dynamo-electric machine. In my present invention the field-magnet coils and armature-helices being in series, every diminution of the resistance of the field-magnet coils, by decreasing the general resistance of the circuit, sends an increase of current through the armature-coils, and increases its magnetic strength and the speed of rotation.

What I claim as my invention, and desire to secure by Letters Patent, is—

1. The method herein specified of varying the speed of magnetic motors, in which the magnet-coils and armature-helices are connected in series by short-circuiting portions of the field-helices, to lessen the resistance and increase the speed of the armature, and lessen the power and the reverse, substantially as set forth.

2. In a magnetic motor, four helices wound, substantially as specified, to produce central N and S poles, and pole-pieces connected to the cores, in combination with the revolving armature and the switches, substantially as specified, for cutting out or short-circuiting the whole or portions of the field-helices, for the purposes set forth.

3. The combination, with the revolving armature and field-magnets, of the pole-pieces $a$ $a'$ at opposite sides of the armature, attached at one end to the field-magnet cores, and curved, and the outer ends nearest to the armature, substantially as specified.

4. In an electric motor, the combination of the field electro-magnets A A', the wires F H I, the contact-piece $e$, the switch-lever L, the wire M, armature D, commutator and brushes E E' E$^2$, and the wire N, substantially as specified.

5. In an electric motor, the combination of the field electro-magnets A A', the wire F, and contact-piece $d$, the wires H and I, the contact-piece $e$, the wires J K M, the switch-lever L, the armature D, the commutator and brushes E E' E$^2$, and the wire N, substantially as specified.

6. In an electric motor, the combination, with field electro-magnets, of the wires Q Q' and switches whereby their adjacent ends may be united, substantially as specified.

7. In an electric motor, the combination, with field electro-magnets, of the wires O O' P P' and switches whereby the same may be connected, substantially as specified.

8. The combination, in an electric motor, of a circular revolving armature, a surrounding frame, and the pole-pieces $a$ $a'$, that are magnetized by induction, and which act with the pole-pieces of the armature, substantially as described.

A. E. G. LUBKE.

Witnesses:
FREDK. HAYNES,
ED. L. MORAN.